(12) United States Patent
Larson et al.

(10) Patent No.: US 10,915,403 B2
(45) Date of Patent: *Feb. 9, 2021

(54) VERSIONED RECORDS MANAGEMENT USING RESTART ERA

(71) Applicant: MICROSOFT TECHNOLOGY LICENSING, LLC, Redmond, WA (US)

(72) Inventors: Per-Ake Larson, Redmond, WA (US); Robert Patrick Fitzgerald, Fall City, WA (US); Cristian Diaconu, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 110 days.

This patent is subject to a terminal disclaimer.

(21) Appl. No.: 16/388,009

(22) Filed: Apr. 18, 2019

(65) Prior Publication Data

US 2019/0243712 A1 Aug. 8, 2019

Related U.S. Application Data

(63) Continuation of application No. 15/001,090, filed on Jan. 19, 2016, now Pat. No. 10,296,418.

(51) Int. Cl.
*G06F 16/23* (2019.01)
*G06F 11/14* (2006.01)

(52) U.S. Cl.
CPC ...... *G06F 11/1417* (2013.01); *G06F 11/1441* (2013.01); *G06F 11/1471* (2013.01); *G06F 11/1474* (2013.01); *G06F 16/2365* (2019.01)

(58) Field of Classification Search
CPC ............. G06F 16/2365; G06F 11/1417; G06F 11/1441; G06F 11/1471; G06F 11/1474
USPC ........... 707/686, 661, 674, 999.202, 999.203
See application file for complete search history.

(56) References Cited

U.S. PATENT DOCUMENTS

| | | | | |
|---|---|---|---|---|
| 6,199,178 | B1* | 3/2001 | Schneider | G06F 11/1435 714/21 |
| 2002/0049883 | A1* | 4/2002 | Schneider | G06F 21/80 711/100 |
| 2004/0167940 | A1* | 8/2004 | Margolus | G06F 16/2358 |
| 2007/0288247 | A1* | 12/2007 | Mackay | G06F 16/113 705/1.1 |
| 2010/0250497 | A1* | 9/2010 | Redlich | H04L 63/0227 707/661 |
| 2012/0069131 | A1* | 3/2012 | Abelow | G06Q 10/067 348/14.01 |
| 2013/0073821 | A1* | 3/2013 | Flynn | G11C 16/06 711/162 |

(Continued)

*Primary Examiner* — Dung K Chau
(74) *Attorney, Agent, or Firm* — Workman Nydegger

(57) ABSTRACT

A versioned records management computing system that uses a restart era in order to promote rapid recovery. A persistent store includes a multi-versioned record collection. The records are also associated with a restart era that corresponds to the era of operation of the computing system after a restart. Upon a recovery, the current restart era changes. An object collection media has an object collection that conforms to an object model such that the object model is used to operate upon the records. The object collection media is operable such that the object collection is durable so as to survive restarts of the system to thereby allow for accelerated recovery.

20 Claims, 6 Drawing Sheets

(56) References Cited

U.S. PATENT DOCUMENTS

2013/0332660 A1* 12/2013 Talagala .............. G06F 12/0246
711/103
2016/0171042 A1* 6/2016 Bendel ................ G06F 16/2308
707/703

* cited by examiner

VERSIONED RECORDS MANAGEMENT USING RESTART ERA

CROSS-REFERENCE TO RELATED APPLICATIONS

This application is a continuation of U.S. patent application Ser. No. 15/001,090 filed on Jan. 19, 2016, entitled "VERSIONED RECORDS MANAGEMENT USING RESTART ERA," which application is expressly incorporated herein by reference in its entirety.

BACKGROUND

Computers and networks have ushered in what has been called the "information age". The ability to persist information in some type of data store a key enabler of this age. Even if power is lost to the data store, the data is persisted such that the next time the power is restored, the data remains preserved as it was. This is important as systems that provide power to the power store cannot be expected to operate indefinitely. For instance, disk storage on a laptop is provided to persist data since laptop users can be expected to (and really should on occasion) power down their laptop. Disk-based storage (originally rotating disk, but then solid state disks) have been in widespread use for some time. Reads from and writes to the disk-based storage is typically done via canonical disk Input/Output (I/O) commands.

Computing systems also include system memory, which is coupled to the processor(s) of the computing system over a memory bus. The processor reads data from (and writes data to) memory locations within the system memory over the memory bus. The processor also provides the address of the location being written to or read from over the memory bus. The processor might typically include one or more caches for faster reads and writes of data that is available in the cache.

Traditionally, such system memory has been volatile memory, in which data is lost when power is no longer supplied. More recently, however, persistent main memory has been developed, which is a persistent form of system memory. When power is lost, the information within the system memory remains intact. Nevertheless, because the caches remain volatile, the information within the caches is often lost.

After an uncontrolled power down of a computing system, the computing system undergoes a process called "recovery". Recovery mechanisms can take some time. Some recovery mechanisms are optimized to try to shorten the time to begin the first task of normal operation after the uncontrolled power down. Other recovery mechanisms are optimized to shorten the time to optimum performance after the uncontrolled power down.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a versioned records management computing system that uses a restart era in order to promote rapid recovery. Whenever the versioned records management computing system recovers after a crash, the restart era is altered. The system has a persistent store that includes multiple items that are each marked with a restart era. The persistent store also includes the identification of the current restart era.

The persistent store includes a multi-versioned record collection that includes records of a collective variety of versions. The records are also associated with a restart era. Any record that was created in the current restart era is marked with the current restart era. On the other hand, the restart era of a record created in a prior restart era does not change instantaneously at the moment of restart. Accordingly, there is an automatically in place a mechanism to distinguish those previously existing records that are to be evaluated for garbage collection, from those items that are visible in the current era, and are thus subject to normal garbage collection that acts on items marked in the current restart era.

The system also includes an object collection media having thereon an object collection that conforms to an object model such that the object model is used to operate upon the records. The object collection media is operable such that the object collection is durable so as to survive restarts of the system. During normal operation, the system performs at least some atomic operations upon the object collection. Accordingly, in case of an impending crash, the object collection is durable and in a consistent state, and is thus available for use consistent with the object model in subsequent recovery of the versioned records management computing system. Furthermore, the visibility of the records is not affected by the record having a prior restart era. Accordingly, the entire record collection and the object collection used to operate thereon are almost immediately available. Thus, normal operations of the system may be resumed more quickly. Meanwhile, marking particular items to promote the items to the current restart era, and thereafter sweeping the unmarked items that have not been promoted to the current restart era, may be done in parallel with normal operations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
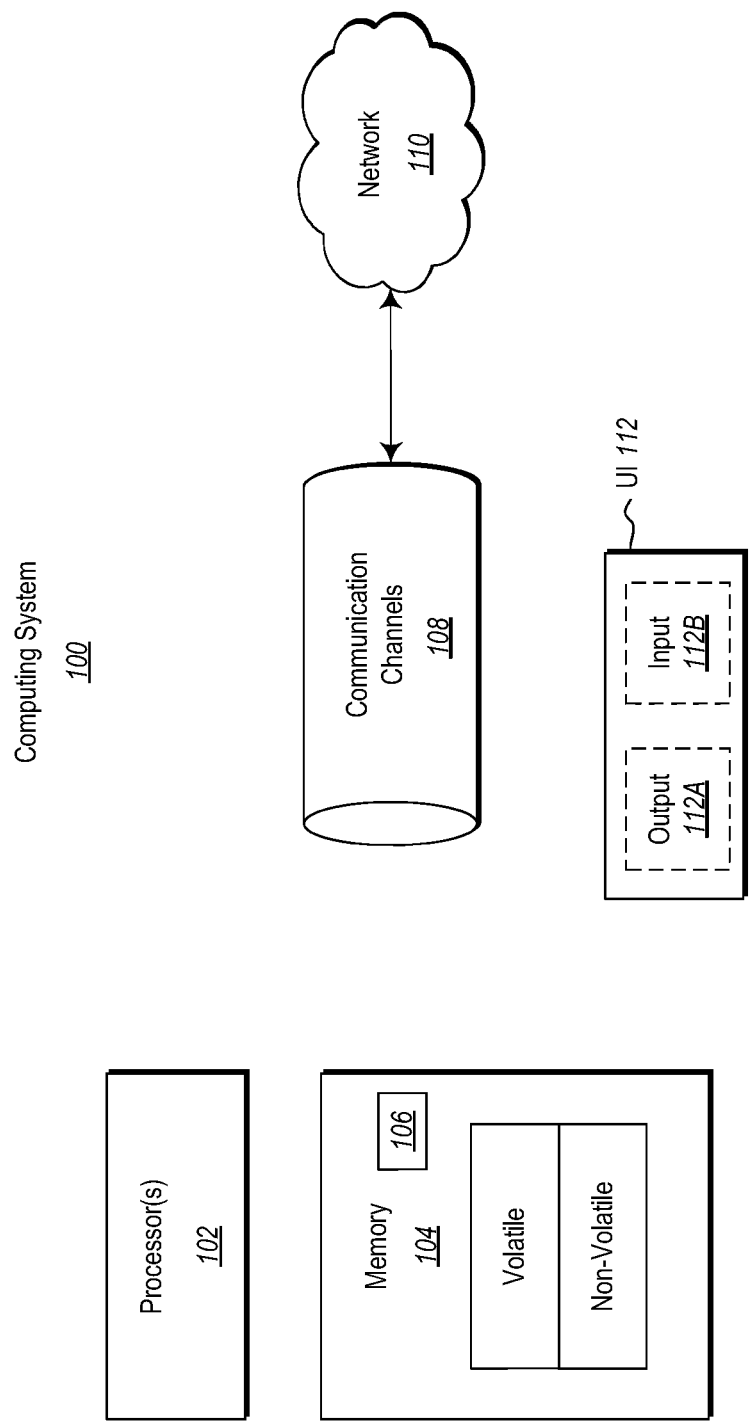
FIG. 1 illustrates an example computing system in which the principles described herein may be employed.

At least some embodiments described herein relate to a versioned records management computing system that uses a restart era in order to promote rapid recovery. Whenever the versioned records management computing system recovers after a crash, the restart era is altered. The system has a persistent store that includes multiple items that are each marked with a restart era. The persistent store also includes the identification of the current restart era.

The persistent store includes a multi-versioned record collection that includes records of a collective variety of versions. The records are also associated with a restart era. Any record that was created in the current restart era is marked with the current restart era. On the other hand, the restart era of a record created in a prior restart era does not change instantaneously at the moment of restart. Accordingly, there is an automatically in place a mechanism to distinguish those previously existing records that are to be evaluated for garbage collection, from those items that are visible in the current era, and are thus subject to normal garbage collection of the garbage collection that acts on items marked in the current restart era.

The system also includes an object collection media having thereon an object collection that conforms to an object model such that the object model is used to operate upon the records. The object collection media is operable such that the object collection is durable so as to survive restarts of the system. During normal operation, the system performs at least some atomic operations upon the object collection. Accordingly, in case of an impending crash, the object collection is durable and in a consistent state, and is thus available for use consistent with the object model in subsequent recovery of the versioned records management computing system. Furthermore, the visibility of the records is not affected by the record having a prior restart era. Accordingly, the entire record collection and the object collection used to operate thereon are almost immediately available. Thus, normal operations of the system to be resumed more quickly. Meanwhile, marking particular items to promote the items to the current restart era, and thereafter sweeping the unmarked items that have not been promoted to the current restart era, may be done in parallel with normal operations.

Some introductory discussion of a computing system will be described with respect to FIG. 1. Then, the operation of the versioned record management computing system will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
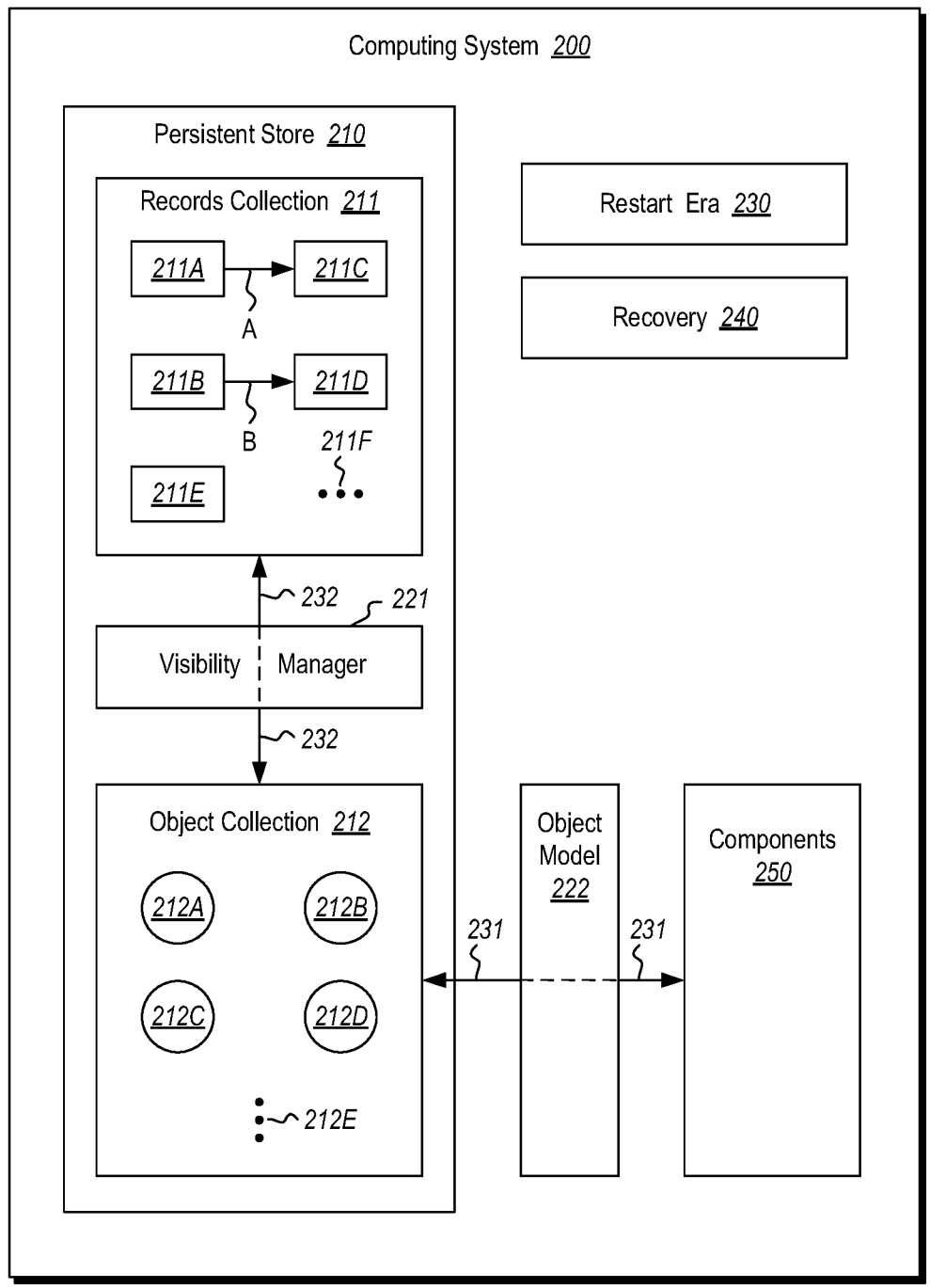
FIG. 2 illustrates a versioned records management computing system in accordance with the principles described herein, which includes a persistent store that includes a records collection and an object collection, and which also includes components that operate upon the same either in normal operation or in recovery.

FIG. 2 illustrates a versioned records management computing system 200 in accordance with the principles described herein. The versioned records management computing system 200 may, for example, be structured as described above for the computing system 100 of FIG. 1. Typically, when a computing system is powered down, the operating system goes through routine shut down procedures so that the next time the computing system reboots, the computing system is in a clean and deterministic state so that normal operation can efficiently continue from that deterministic state.

However, sometimes computing systems simply crash, in which case for one reason or another, the computing system is not able to run through the routine shut down procedures before being powered down. For instance, the computing system might lose power unexpectedly. Alternatively, applications or operating systems may simply freeze so as to prevent running of the routing shut down procedures, thereby compelling a user to force a power down. In the case of such a crash, upon reboot, the computing system goes through recovery procedures to salvage the data that can be salvaged while maintaining a consistent state of the computing system. Often recovery operations can take noticeable time, particularly when high volumes of data are involved, such as in a database.

For instance, a log may be used to order to recover records back to a particular state. In order to do so, the last snapshot of the records is first obtained. Then, a process called "walking the log" occurs in which the logged events that occurred against the records after the snapshot are performed in order to bring the records more current. In a transactional system, some of the actions that have not yet been committed as part of the transaction may need to be undone. After this is done, all of the records that were valid prior to the crash are now again valid. However, many of the supporting structures and components that are used to operate against the records may still need to be restored in order for normal operation to proceed. It is often the restoration of these supporting structures and components that can take significant and often the majority of the recovery time.

The computing system 200 is illustrated with the state that exists on the computing system 200 at the time that a recovery reaches the point where the persistent store is again operational. Despite the inability to go through the normal shutdown routines, the computing system 200 still has an object collection 212, which includes all of the objects that are used via an object model 222 to operate upon the records of the record collection 211. The objects of the object collection 212 include those supporting structures and components that allow for normal operation upon the records collection 212. Accordingly, normal processing may begin immediately using the object collection 212 and the object model 222. This significantly speeds up the initiation of normal processing.

Furthermore, the persistent store 210 may be persistent main memory. Thus, there is little, if any, ramp up time required after normal operation begins in order to bring records and supporting structures and components into main memory. Normal operation can therefore begin quickly, and when it begins, normal operation is efficient.

The multi-versioned record collection 211 includes multiple records. For instance, the record collection 211 is shown as including five records 211A, 211B, 211C, 211D, and 211E (each represented as a small rectangle), although the ellipses 211F symbolically represent that the record collection 211 may include any number of records. The records may include any segment of data. In one embodiment, the records are each rows. There may be any number of records in the record collection, even perhaps billions or more. Regardless, the record collection includes multiple versions of data. In fact, multiple versions of a record may exist simultaneously. For instance, record 211C may represent a new version of record 211A (as symbolized by arrow A). Record 211D may represent a new version of record 211B (as symbolized by arrow B). Record 211D may perhaps just have one version for now. Accordingly, when the term "record" is used herein related to the contents of the records collection, these records may more properly be thought of a record version. For instance, record versions 211A and 211C may be collectively thought of as a record. Record versions 211B and 211D may likewise collectively be thought of as a record.

A visibility manager 221 intercedes with the records collection 211. The visibility manager 221 may access any of the records of the records collection 211. However, the visibility manager 221 may also provide a view on the records that is specific to a given time—that is, which records are valid for a given time. For instance, for a particular time, perhaps only two of the records (e.g., records 211A and 211B) are actually visible through the visibility manager 221 since at that particular time, those are the versions that validly represent the state of an piece of data (e.g., a row) at that given time. For instance, the records may have an associated begin timestamp and end timestamp that define the range of time that the record is considered to exist from the viewpoint of the applications and components (components 250 of FIG. 2) that use the record. Accordingly, given a particular time, the visibility manager 221 can determine which records are to be visible at that particular time.

The object collection 212 includes multiple objects that each conform to an object model 222. As an example only, the objects collection 212 is illustrated as including four objects 212A through 212D, although the ellipses 212E represent flexibility in the number and types of objects that conform to the object model 222. Components 250 use the object model 222 in order to interface with (as represented by arrow 231 the objects of the object collection 212. The objects in the object collection 212 respond by interfacing (as represented by arrow 232) with the records of the records collection 211. An example of such an object is an index that maps a record (e.g., a row) of the records collection 211 to a record group (e.g., a table).

More generally speaking, the object model 222 may be used by applications, components, operating systems, and so forth, in order to perform operations on the records of the records collection 211. By walking the log from the last checkpoint, conventional recovery ensures that all of the records that were valid and visible at any given time prior to the crash remain valid and visible at that time after the crash. However, unlike prior recovery technology, on recovery, the object collection 212 is already valid in that the object model 222 can be used immediately to perform operations on any valid record of the record collection 211. The object collection 212 does not need to be rebuilt to be operable with the object model 222. It is already in such a state.

In order to allow this to be the state of the object collection 212 at the beginning of recovery, the object collection 212 may at all normal operation times be in a persistent main memory. All operations performed using the objects are performed using the objects as they exist in the persistent main memory. In another embodiment, the object collection 212 is permitted to be in a volatile cache during normal operation. However, if the computing system 200 detects an impending crash, at least a portion of that volatile cache (e.g., a cache coherency domain) is quickly saved into the persistent main memory.

In any case, the end result is the same—the object collection 212 is in the persistent store 210 during the recovery and is immediately usable via the object model 222, and such that the objects are in a known location upon restart. Furthermore, in some embodiments, the operations upon the objects themselves are atomic and lock-free, therefore providing that each of the objects in the object collection 212 will be consistent, and not in a mid-operation state.

Figure 3:
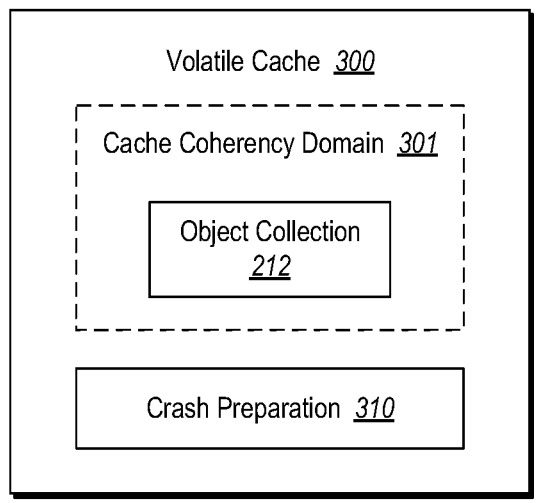
FIG. 3 illustrates a volatile cache that includes a cache coherency domain, and at least part of an object collection.

For instance, FIG. 3 illustrates a volatile cache 300 that includes a portion 301 that includes at least part of object collection 212. In the state, the object model 222 may be used to control the object collection. The volatile cache further has a crash preparation structure 310 that detects imminent crash conditions, and places the content of the portion 301 into the persistent store 210 in a manner that the object model 222 can still be used against the object collection 212 in the persistent store 210. However, there are other ways of ensuring that the object collection 212 is within the persistent store 210 during the next restart. For instance, there could be a shadow copy of the cached object collection within a persistent main memory or within a log. Alternatively, the cache itself could be durable across restarts.

The persistent store 210 also has associated with it a restart era 230. The restart era is an identifier that is changed every time the system 200 recovers from a crash. Accordingly, the restart era 230 uniquely identifies an era of time bounded on each side by a recovery. At any given time, the restart era 230 is the current restart era.

Figure 4:
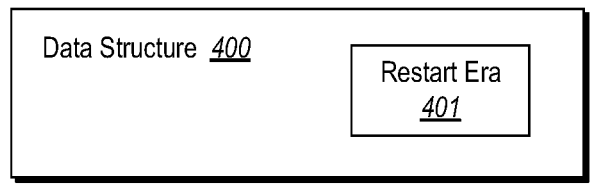
FIG. 4 schematically illustrates a data structure that has an associated restart era that represents a period of time between recoveries.

Each of the items in the persistent store 210 has a restart era identifier associated therewith, which is not necessarily the same as the restart era of the current restart era 230. For instance, FIG. 4 schematically illustrates a data structure 400 that has an associated restart era 401. The data structure 400 may represent any of the records of the record collection 211 and any of the objects in the object collection 212. Any new record that is created in the current restart era has its restart era marked as the current restart era. On the other hand, the visibility manager 221 does not use the restart era 401 of a record to determine whether the record is currently visible. Thus, the entire record collection 211 is almost immediately available for normal operations. Furthermore, since the object collection 212 is stored in persistent memory, the object collection 212 is available upon restart for normal operations using the object model 222. Thus, normal operations may proceed almost immediately with minimal work. For instance, there may be some work to connect tables and indices to their memory allocators.

Figure 5:
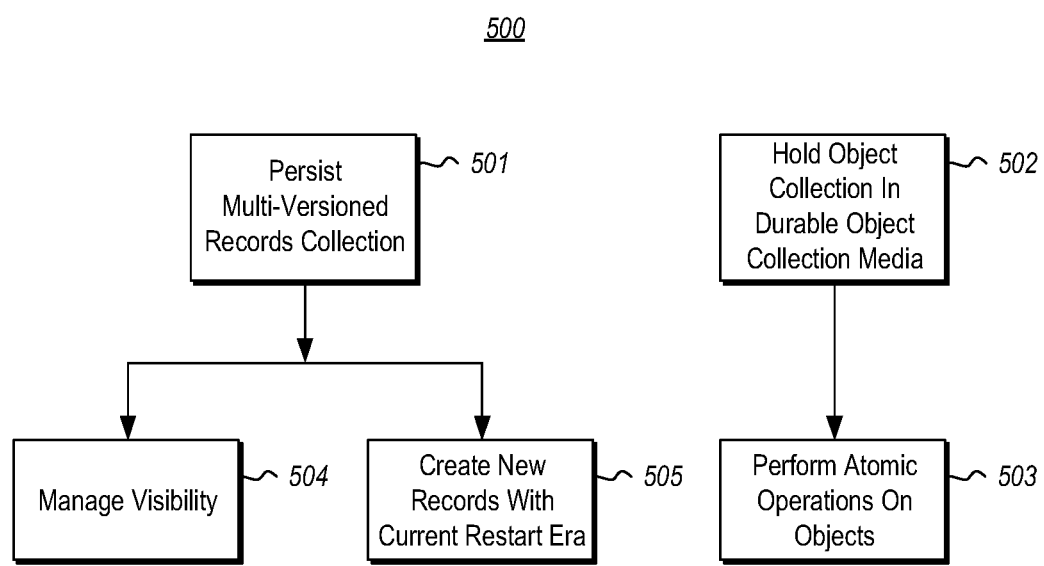
FIG. 5 illustrates a flowchart of a method for operating a versioned records management computing system so that during recovery, the object model can be quickly used to interface with the object collection.

As previously mentioned, unlike prior recovery technology, on recovery, the object collection 212 is already valid in that the object model 222 can be used immediately to perform operations on any valid record of the record collection 211. This allows for rapid recovery. However, in order to ensure this state of the object collection during recover, some provisions may be made during normal operation. FIG. 5 illustrates a flowchart of a method for operating a versioned records management computing system so that during recovery, the object model 222 can be quickly used to interface with the object collection.

In accordance with the method 500, a multi-versioned record collection in a persistent store (act 501). For instance, in FIG. 2, the records 211A through 211F (or the record versions 211A through 211F) are held within the persistent store 210. As previously mentioned, these records are of a variety of versions, and are associated with a restart era.

Also in accordance with the method 500, an object collection is held on an object collection media (act 502).

For instance, in FIG. 2, during normal operation, the object collection 212 may be held in the persistent store 210 and/or in the volatile cache 300. Either way, the object collection 212 may be seen as durable since on crash, the object collection 212 will ultimately be persistent within the persistent store 220.

Furthermore, during normal operation, at least some atomic operations are performed upon the object collection (act 503) such that in the case of an impending crash, the object collection is durable in a consistent state, and is available for use consistent with the object model in subsequent recovery of the versioned records management computing system.

Furthermore, during normal operations, the visibility of the records are managed (act 504) based on the version of each record. Also, creation of new records are done so as to associate the record with the current era (act 505).

Figure 6:
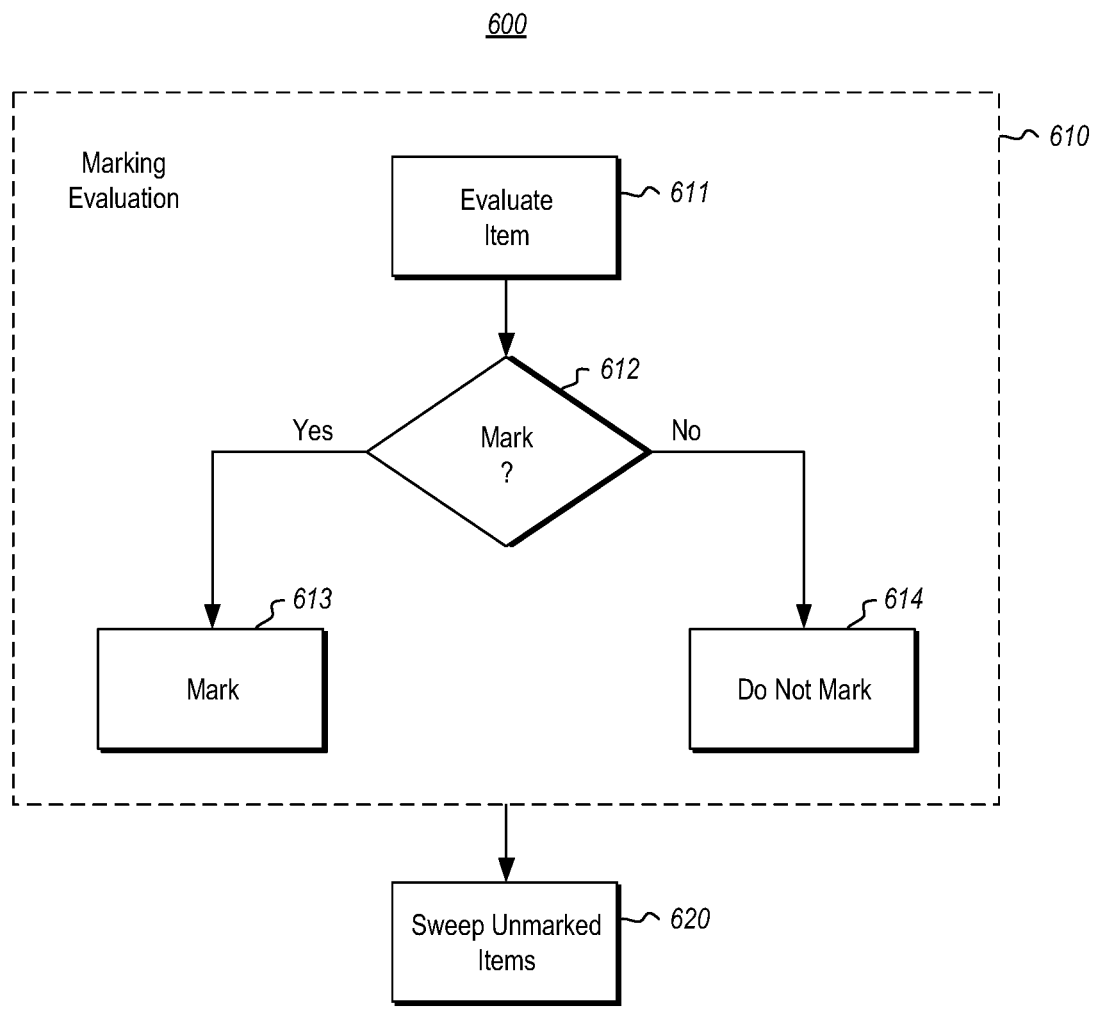
FIG. 6 illustrates a flowchart of a method for promoting at least some of the plurality of records to the current restart era in accordance with the principles described herein.

Returning to recovery, while the restart era 230 of the persistent store is changed upon recovery operations beginning, the determination of an appropriate restart era 401 for each of the records may be determined in parallel with normal operations. FIG. 6 illustrates a flowchart of a method 600 for promoting at least some of the plurality of items (e.g., records or objects) to the current restart era in accordance with the principles described herein. Recall that this may be performed in parallel with normal operation as a background process. During normal operations, if a record is created, this record is automatically given a restart era 401 equal to the current restart era 230.

The first part of the method 600 is marking evaluation 610 and is represented by the collective acts within the dashed-lined box 610. The marking evaluation 610 is performed for each item (e.g., record or object) that does not have a restart era 401 of the current restart era 230. A recovery component (e.g., recovery component 240 of FIG. 2) evaluates the record (act 611) to determine whether or not the item should be marked (decision block 612). If the record should be marked ("Yes" in decision block 612), the record is marked (act 613), by promoting the item to the current restart era. For instance, marking might occur by changing the restart era 401 of the item to be the current restart era 230. If the item is not to be marked ("No" in decision block 612), the record is not marked (act 614). For instance, refraining from marking the item (act 614) may simply involve not changing the restart era 401 of the item.

After the marking evaluation (act 610) is performed on all of the items that do not have the current restart era, the unmarked items are then swept (act 620) from the persistent memory. In other words, the persistent store is scanned for items, and for each item that does not have the current restart era, the item is deleted.

Figure 7:
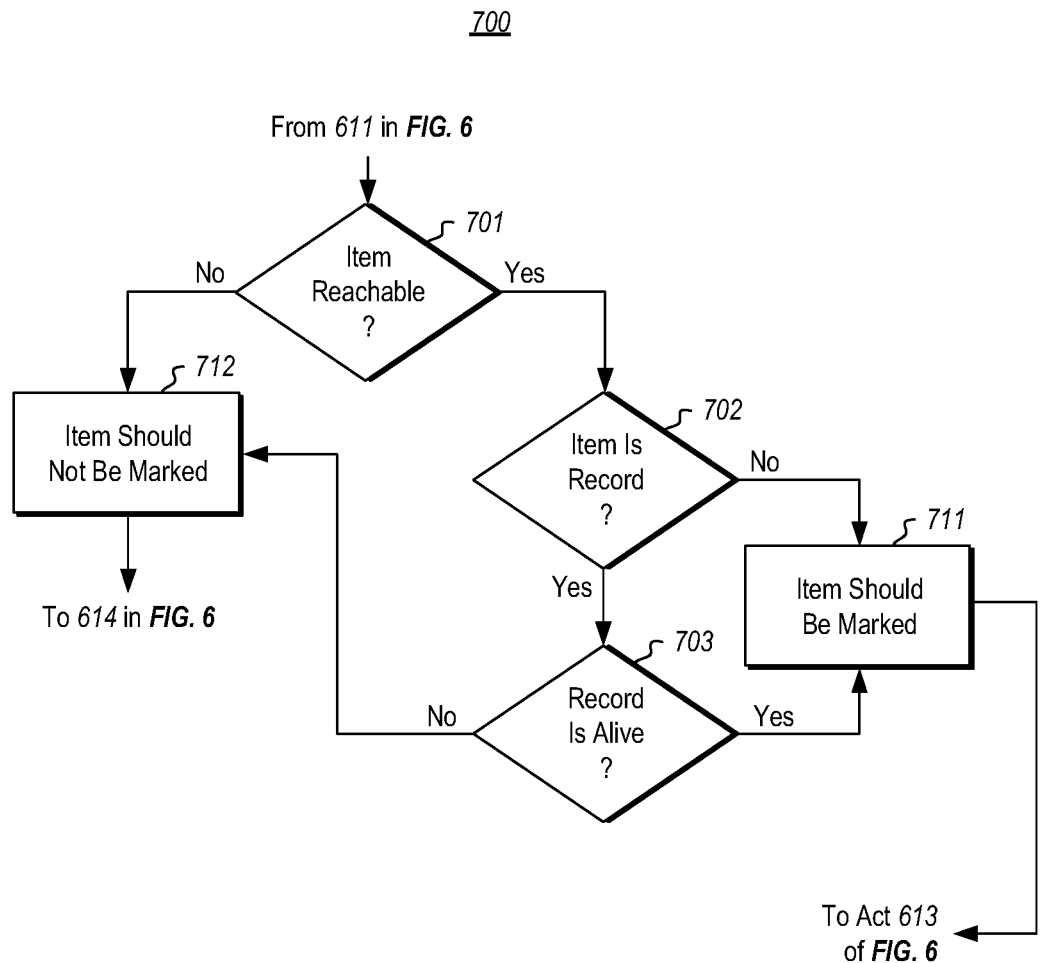
FIG. 7 illustrates a flowchart of a method for evaluating a particular record to determine whether the record should be marked.

FIG. 7 illustrates a flowchart of a method 700 for evaluating a particular item to determine whether the record should be marked. The method 700 represents an example of how the decision of decision block 612 may be accomplished.

First, the recovery component determines whether the particular item is reachable via the object collection (decision block 701). For instance, this reachability analysis may be performed for all items by scanning through the object collection (e.g., the indices in the case of a database) to determine if there is any way to reach the particular item. If the particular item is reached via scanning of the object collection ("Yes" in decision block 701), then perhaps this is the conclusion of the analysis that determines that the item should be marked (act 711). In one embodiment, however, in the case of the item being a record ("Yes" in decision block 602), the analysis further evaluates whether or not the record is visible to any active process (e.g., any active transaction). That is, it is determined whether the record is still alive (decision block 703). If the record is referred to by an active process ("Yes" in decision block 703), then the record is to be marked with the current restart era (act 711). Accordingly, if the item is not reachable ("No" in decision block 701), or is a record that is not alive ("Yes" in decision block 702 and "No" in decision block 703), then the record is not to be marked (act 712). On the other hand, if the item is reachable ("Yes" in decision block 701), and is not a record ("No" in decision block 702), then the item is marked (act 711). If the item is a record that is reachable and alive ("Yes" in all of decision blocks 701 through 703), then the records is to be marked (act 711).

In a transactional system, in order to determine whether a record is alive, it may be necessary to determine whether or not the transaction that created or deleted the record has committed. If, for instance, a record was created by a transaction, then whether the record is valid rests on whether the transaction committed. If the transaction committed, the created record is potentially valid (alive) if there are still active transactions that may reference the created record. If the transaction did not commit, then the record is invalid (not alive). If the record was deleted by a transaction, then whether the record is valid again rests on whether the transaction committed. If the transaction committed, the deleted record is invalid (not alive). If the transaction did not commit, then the deleted record was not really deleted and the record is still valid (alive).

The determination of whether a transaction has committed or not may be implemented in any number of ways. For instance, the commit status of a transaction could be stored durably in persistent memory and kept until the information is no longer needed. Also, the information may be found in a log or potentially a durable cache. The commit status may thus be looked for in these durable areas. In the above-described embodiments, all or most record versions that are reachable through an index have their restart era fields updated to the current restart era.

There is an alternate embodiment that does not require updating of the restart era fields of all reachable record versions. The avoidance of such updating is beneficial as writing to a record version can consume computing resources, and there may be many record versions from prior restart eras that are reachable via indices. In the alternate embodiment, non-record objects (such as objects within the object collection 212) are marked as described. However, marking is not performed in the marking stage as described above for record versions within the record collection 211. Instead, during the sweeping stage, the record versions are evaluated, and the restart era updated in relatively few records. This alternative embodiment uses the fact that the restart era of a record version is largely ignored when determining visibility of the record.

In this alternative embodiment, during the sweep phase, the recovery module reads each record version. If the restart era of the record version is the current restart era, the record version is ignored by the sweep phase. However, if the record has a prior restart era, the sweep mechanism distinguishes between record versions that may still be visible, and those that cannot (and thus are garbage and should be swept up). It does so considering the begin timestamp and the end timestamp of the record. The begin timestamp represents the commit time of the transaction that created the record. The end timestamp represents the commit time of the transaction that deleted the record, or is infinity if the record has not yet been deleted. A record is visible at a given time if that given time falls between the times expressed in the begin and end timestamps. If the transaction that creates the record is still in process, the begin timestamp is populated with the transaction identifier of that transaction. If the transaction that deletes the record is still in process, the end timestamp is populated with the transaction identifier of that transaction. These transaction identifiers are relative to the restart era of the record version.

For those record versions of a prior restart era, if there is a valid begin timestamp (a time), and there is an infinity end timestamp, that record version may be visible and it may optionally left alone without updating its restart era. For those record versions of a prior restart era, if there is a transaction identifier in the begin timestamp and if that transaction from a prior restart era committed but its commit postprocessing never completed, then the begin timestamp of the record version is updated to the begin timestamp of the transaction, otherwise the row version is submitted for deletion. For those record version of a prior restart era, if there is a transaction identifier in the end timestamp, and if that transaction from a prior restart era committed but its commit postprocessing never completed, then the record version is submitted for deletion, otherwise the end timestamp of the record version is set back to infinity.

Before a record version from a prior restart era can be deleted, it is made unreachable. If it is not marked free, then its end timestamp is either a timestamp of an infinity mark. In this case, the record version may be reachable via some number of indices, and each index is asked whether the record is reachable by it, and if the record version is reachable, to remove it. Once all indices have confirmed that the record version is not reachable, then the record version is not reachable at all, and the record version may be reclaimed. Before reclaiming, the record version is first promoted to the current restart era, then marked free, and the unit of storage that previously held the record version is then put on the appropriate free list.

Accordingly, the principles described herein provide a mechanism for performing normal operations in a manner to support quickly recovering from a crash using a persistent store. The supporting structures and components for operating upon records are immediately available upon recovering valid representations of the records. Furthermore, if the persistent store is main memory itself, there is little, if any, ramp up time in normal operation. Accordingly, more efficient initiation of normal operation is accomplished.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating crash recovery of supporting components of a computer system through managed control of multiple data records having different restart era identifiers, where the supporting components perform operations that are dependent on the multiple data records such that faster recovery of the multiple data items allows for faster recovery of the supporting components, and where a restart era identifier of a data record initially identifies a particular restart era during which that data record was created, the method being performed by the computer system and comprising:

identifying, within persistent main memory of the computer system, a plurality of data records, wherein each data record in the plurality of data records is marked with a corresponding restart era identifier to indicate whether said each data record was created during a current restart era of the computer system or a previous restart era of the computer system;

selectively promoting a set of data records that are included in the plurality of data records and that are marked as being created during the previous restart era, wherein promoting the set of data records is performed by updating corresponding restart era identifiers for the set of data records to indicate the current restart era instead of the previous restart era;

for remaining data records whose restart era identifiers still indicate the previous restart era, sweeping said remaining data records from the persistent main memory; and causing supporting components of the computer system to perform operations using data items having restart era identifiers indicative of the current restart era.

2. The method of claim 1, wherein at least some data records included in the plurality of data records represent multiple versions of a same data unit.

3. The method of claim 1, wherein each data record in the plurality of data records is a row in a database.

4. The method of claim 1, wherein a particular supporting component included among the supporting components of the computer system is an index that maps a particular record included in the persistent main memory.

5. The method of claim 1, wherein restart eras, including the previous restart era and the current restart era, uniquely identify an era of time bounded by a computing crash recovery.

6. The method of claim 1, wherein selectively promoting the set of data records is performed as a background process.

7. The method of claim 1, wherein a visibility is determined for each of at least some data records included in the plurality of data records.

8. The method of claim 1, wherein the supporting components are brought into the persistent main memory.

9. The method of claim 1, wherein shadow copies of the supporting components are included in the persistent main memory.

10. The method of claim 1, wherein shadow copies of the supporting components are included within a log.

11. A computer system comprising:
one or more processor(s); and
one or more computer-readable hardware storage device(s) having stored thereon computer-executable instructions that are executable by the one or more processor(s) to cause the computer system to:
identify, within persistent main memory of the computer system, a plurality of data records, wherein each data record in the plurality of data records is marked with a corresponding restart era identifier to indicate whether said each data record was created during a current restart era of the computer system or a previous restart era of the computer system;
selectively promote a set of data records that are included in the plurality of data records and that are marked as being created during the previous restart era, wherein promoting the set of data records is performed by updating corresponding restart era identifiers for the set of data records to indicate the current restart era instead of the previous restart era;
for remaining data records whose restart era identifiers still indicate the previous restart era, sweep said remaining data records from the persistent main memory; and
cause supporting components of the computer system to perform operations using data items having restart era identifiers indicative of the current restart era.

12. The computer system of claim 11, wherein at least some data records included in the plurality of data records represent multiple versions of a same data unit.

13. The computer system of claim 11, wherein each data record in the plurality of data records is a row in a database.

14. The computer system of claim 11, wherein a particular supporting component included among the supporting components of the computer system is an index that maps a particular record included in the persistent main memory.

15. The computer system of claim 11, wherein restart eras, including the previous restart era and the current restart era, uniquely identify an era of time bounded by a computing crash recovery.

16. The computer system of claim 11, wherein selectively promoting the set of data records is performed as a background process.

17. The computer system of claim 11, wherein a visibility is determined for each of at least some data records included in the plurality of data records.

18. The computer system of claim 11, the previous restart era includes multiple previous restart eras.

19. One or more hardware storage device(s) having stored thereon computer-executable instructions that are executable by one or more processor(s) of a computer system to cause the computer system to:
identify, within persistent main memory of the computer system, a plurality of data records, wherein each data record in the plurality of data records is marked with a corresponding restart era identifier to indicate whether said each data record was created during a current restart era of the computer system or a previous restart era of the computer system;
selectively promote a set of data records that are included in the plurality of data records and that are marked as being created during the previous restart era, wherein promoting the set of data records is performed by updating corresponding restart era identifiers for the set of data records to indicate the current restart era instead of the previous restart era;
for remaining data records whose restart era identifiers still indicate the previous restart era, sweep said remaining data records from the persistent main memory; and
cause supporting components of the computer system to perform operations using data items having restart era identifiers indicative of the current restart era.

20. The one or more hardware storage device(s) of claim 19, wherein restart eras, including the previous restart era and the current restart era, uniquely identify an era of time bounded by a computing crash recovery.

* * * * *